United States Patent [19]

Ropp

[11] 4,087,511
[45] May 2, 1978

[54] GLASSES PREPARED BY THE MELTING OF STOICHIOMETRIC COMPOUNDS

[75] Inventor: Richard C. Ropp, Warren, N.J.

[73] Assignee: Allied Chemical Corporation, Morris Township, N.J.

[21] Appl. No.: 780,202

[22] Filed: Mar. 22, 1977

Related U.S. Application Data

[63] Continuation-in-part of Ser. No. 633,776, Nov. 20, 1975, abandoned.

[51] Int. Cl.$^2$ .......................... C03C 3/00; C03C 3/12
[52] U.S. Cl. ................................ 423/277; 423/305; 423/508; 423/554; 423/593; 423/602; 106/47 R; 65/134
[58] Field of Search ............... 423/277, 305, 314, 508, 423/593, 520, 554–555, 602–603; 106/47 R; 65/134

[56] References Cited

U.S. PATENT DOCUMENTS

| | | | |
|---|---|---|---|
| 1,570,202 | 1/1926 | Buck | 106/47 R |
| 1,654,404 | 12/1927 | Blumberg et al. | 106/47 R |
| 2,434,281 | 1/1948 | Moulton | 106/47 R |
| 3,107,238 | 3/1964 | Fuchs | 106/47 R X |
| 3,220,861 | 11/1965 | Parry et al. | 106/47 R |
| 3,926,649 | 12/1975 | Ray et al. | 106/47 R |

FOREIGN PATENT DOCUMENTS

| | | | |
|---|---|---|---|
| 601,449 | 7/1960 | Canada | 106/47 R |
| 504,835 | 8/1954 | Canada. | |
| 1,387,301 | 3/1975 | United Kingdom | 106/47 R |

OTHER PUBLICATIONS

Mellor: A comphrehensive Treatise on Inorganic & Theoretical Chem., Longmans Greene & Co., N.Y. 1923, pp. 881-883.

*Primary Examiner*—G. O. Peters
*Attorney, Agent, or Firm*—Arthur J. Plantamura; David W. Collins

[57] ABSTRACT

Chemically durable non-silicate glasses derived from compounds including phosphates, borates, arsenates, sulfates, tellurates, tellurites, germanates and the like, are prepared by forming a melt from monobasic compounds of stoichiometric proportions, said melt then being polymerized by suitable means in the melt stage and subsequently cooled to form a desired glass. The resulting glass exhibits properties not normally found in similar glasses prepared from melts of oxides of the same materials.

38 Claims, No Drawings

GLASSES PREPARED BY THE MELTING OF STOICHIOMETRIC COMPOUNDS

BACKGROUND OF THE INVENTION

This is a continuation-in-part application of Ser. No. 633,776 filed Nov. 20, 1975, now abandoned.

The usual process in the prior art preparation of glasses is to mix selected oxides together in desired proportions and to heat at elevated temperatures to form a melt. The melt is then cast into a mold and cooled. The glass resulting therefrom is then processed according to desired end uses. This process is normally suitable only for glasses based on silica. Attempts to make non-silica glasses, such as phosphates, borates, etc. in a chemically stable form have been largely unsuccessful. Typical of such prior art systems in which phosphates are employed are those processes set forth in U.S. Pat. Nos. 2,434,281; 2,031,579; 2,064,344 and 3,485,646. The compositions utilized in those patents is $P_2O_5$ or $H_3PO_4$ or $HPO_3$. Compounds which decompose to the oxide to form a compound such as $NaPO_3$ and $Al(PO_3)_3$ have also been prepared from an $HPO_3$ which are then used to prepare the glass. However, the prior art systems and/or methods do not recognize the criticality in obtaining a glass product of desired properties by preparing monobasic compounds in essentially pure stoichiometric form prior to melting the compounds to form the polymeric glass.

SUMMARY OF THE INVENTION

In accordance with the invention, non-silicate glasses, such as those based on phosphates, borates, arsenates, sulfates, tellurates, tellurites, germanates and the like, are prepared by first making monobasic compounds of stoichiometric equivalent and then using these precursors to form the melt which is then polymerized to form the desired glass. The non-silicate glasses within contemplation of the invention are prepared from compositions of the general formula $M(H_aX_bO_c)_d$ wherein M is a metal of the group consisting of aluminum, zinc, cadmium, iron, tin, manganese, lead, nickel, cobalt, gallium, indium, and the alkaline earth metals, beryllium, magnesium, calcium, strontium and barium, X is an anionic species, i.e. the anionic component of the precursur compound, selected from the group consisting of phosphorus, boron, arsenic, sulfur, germanium and tellurium, and "$a$" has a value of 1 to 3; "$b$" has a value of 1 to 4; "$c$" has a value of from 1 to 10; and the value of "$d$" is 2 or 3 depending upon the valence charge of M. The precursor compound to be used in forming the glassy product of the invention is prepared by making a solid stoichiometric compound of the above formula from the acid of the compound in aqueous solution. The solid precursor monobasic salt so derived is isolated and then melted by heating to elevated temperature whereupon the precursor compound reacts chemically, i.e. undergoes intrareaction, and forms a substantially homogeneous melt; the melt is retained at elevated temperatures until reaction of said compound in the melt stage is essentially complete, i.e. until essentially complete condensation and/or polymerization has occurred.

DESCRIPTION OF THE PREFERRED EMBODIMENT

One of the major properties adversely affecting the commercial usage of the non-silicate glasses is chemical durability. Chemical durability of a glass is usually defined in terms of the rate of chemical etching of the surface by a liquid such as boiling water. A convenient reference is the durability or weight loss of plate glass (soda lime silicate) in boiling water which is 0.053 mg/cm$^2$/hr, or of Pyrex glass (borosilicate) in which the weight loss is 0.003 mg/cm$^2$/hr. I have discovered, for example, that phosphate glasses prepared according to the present invention exhibit marked improvement in chemical durability and rival those of the silicate-based glasses, a highly significant order of change in the chemical durability which has not been achieved heretofore. For example, the prior art quotes durabilities for phosphate glasses ranging from 2.2 to 83 mg/cm$^2$/hr. For a calcium phosphate glass prepared according to the invention, I have achieved a durability of 0.11 mg/cm$^2$/hr while an aluminum phosphate glass showed a durability of 0.000054 mg/cm$^2$/hr. Magnesium phosphate glass exhibits a durability of .084 mg/cm$^2$/hr. These values are improved generally in the order of at least ten to as much as a thousand times over the durabilities of the prior art.

In accordance with the invention, I have found that, for non-silicate glasses such as those based upon phosphates, borates, sulfates, arsenates, tellurites, tellurates, and germanates, and the like, it is essential to form a stoichiometric compound to be a precursor of specific proportions which is then used to form the melt, followed by polymerization to form the desired glass. The resulting glass thereby exhibits properties not normally found for similar glasses prepared from melts of oxides.

The present invention in essence utilizes selected precursor compounds of stoichiometric proportions which are melted to form a glass. Such precursors within the contemplation of the invention are those having the formula

$$M(H_aX_bO_c)_d$$

wherein M is a metal selected from the group consisting of Al, Zn, Cd, Fe, Sn, Mn, Pb, Ni, Co, Ga and In and the alkaline earth metals Be, Mg, Ca, Sr and Ba; X is an anionic species selected from the group consisting of P, B, As, S, Ge and Te; $a$ has a value of 1 to 3, $b$ has a value of 1 to 4; $c$ has a value of 1 to 10; $d$ is 2 or 3 depending upon the valence charge of M. Illustrative of precursors within this formula in which the metal M may be either divalent or trivalent are the following:

TABLE I

| Glasses | Divalent | Trivalent |
|---|---|---|
| Phosphates | M(H$_2$PO$_4$)$_2$ | M(H$_2$PO$_4$)$_3$ |
| Borates | M(H$_2$BO$_3$)$_2$ | M(H$_2$BO$_3$)$_3$ |
| Arsenates | M(H$_2$AsO$_4$)$_2$ | M(H$_2$AsO$_4$)$_3$ |
| Germanates | M(H$_3$GeO$_4$)$_2$ | M(H$_3$GeO$_4$)$_3$ |
| Sulfates | M(HSO$_4$)$_2$ | M(HSO$_4$)$_3$ |
| Tellurates | M(HTeO$_4$)$_2$ | M(HTeO$_4$)$_3$ |
| Tellurites | M(HTeO$_3$)$_2$ | M(HTeO$_3$)$_3$ |

Although in the description which follows, reference is made primarily to phosphate glasses as typical, it will be understood that the invention is applicable as well to the non-phosphate glasses referenced with the above formula. Accordingly, the same general principles apply to the preparations of glasses of the invention other than phosphorus among the compounds selected from the group defined above, it being understood that some variation in the respective systems may be desirable for optimum results depending on the particular glass being formed.

Purity of the raw materials used in making the melt is a major consideration and the glass so-produced preferably should not contain more than about 1 to 10 ppm of impurities. Such a glass then transmits ultraviolet and has a cutoff of about 2000A for polymer glasses of Ca($PO_3$)$_2$.

In preparing the glass it is necessary to initiate a condensation and polymerization reaction of the orthophosphate anions and it is essential that this be done by a series of reactions which start with the monobasic salts of these compounds, e.g. M(H$_2$PO$_4$)$_2$, which may or may not be hydrated. The dibasic salts are not effective since they cannot be polymerized. The degree of hydration is of little importance since the water is driven off during the glass formation.

One skilled in the art may utilize known procedures of thermal analysis such as differential thermal analysis and/or thermogravimetric analysis to determine the heating cycle required and the programming cycle needed for each precursor prior to entering the melt stage. The time required to cause complete polymerization in the melt can be determined from viscosity measurements of the melt, since polymerization within the melt increases the viscosity to some final point where polymerization is complete.

Most of the monobasic salts are soluble in water and the acid of the salt is used in its preparation from aqueous solution wherein the salt is isolated therefrom by evaporation techniques. For example, for phosphates, H$_3$PO$_4$ is used, and for sulfates, H$_2$SO$_4$ is employed. Conventional methods of preparation are suitable if impurities are not introduced into the finished monobasic salts. The dried salt, isolated from solution, is freed from excess acid and then is melted in an inert crucible in air. Excess acid must be first removed since its presence affects the reaction path of the salt. It appears that the initial reaction forms the acid pyrophosphate (i.e. — two phosphate tetrahedra become hooked together) when excess acid is present. The succeeding reaction then involves formation of a ring structure (i.e. — tetrapoly phosphate, M$_3$P$_4$O$_{13}$, depending upon the nature of the metal M). The ring structure may contain up to 6 phosphate tetrahedra hooked together. This occurs during the initial stages of the reaction in the presence of excess acid. At elevated temperatures it appears that the rings open to form limited chain or cyclic polymers depending upon how much excess acid is present.

However, if all excess acid is deliberately removed so that an essentially stoichiometric monobasic salt is obtained, then the reaction path of the salt is completely different. Instead of the acid pyrophosphate, the first reaction product is a tetrametaphosphate having a ring structure and approximate composition, M$_2$P$_4$O$_{11}$(OH)$_2$. Even minute quantities of acid affect this reaction mechanism, giving the acid pyrophosphate when acid is present.

The tetrametaphosphate intermediate then reacts to form M$_{18}$P$_{16}$O$_{46}$(OH)$_4$ which then melts leaving reactive hydroxyl groups attached to the chain structure in the melt stage. It will be recognized that this reaction is a condensation and polymerization reaction and that further polymerization can be brought about by reacting the hydroxyl groups to cause increase of the linear chains, to form a polymerized melt consisting of long chains of metaphosphates as the hydroxyl groups react to effect polymerization and chain propagation. If excess acid is present, the hydroxyl groups from the acid cause self-branching of the linear chains as the cyclic rings open up in the final condensation reaction and thereby cause limiting of the length of the chains in the final glass. Such a glass does not possess the unexpected property of high resistance to hydrolysis as does glass prepared according to the present invention. It will be understood that the invention is not to be limited by the foregoing experimental observations on the reaction mechanism and the role of the acid therein. The melt may then be cooled by conventional technique to form a glass suitable for electronic medical and optical applications.

It will be recognized that the instant invention results from the recognition that only pure monobasic stoichiometric salts will function, that the monobasic salts must be entirely free of any residual acids, and that only by continuing the heating of the salt melt until polymerization is complete will the desired glass be produced. Even though a glass can be formed, a product which results from a relatively rapid cooling of a melt, this does not necessarily mean that a polymeric glass has been obtained.

For example, considering (a) polymeric and (b) non-polymeric calcium phosphate glasses, the densities and glass transition points are as compared in the following table.

Table A

|  | polymeric (a) | non-polymeric (b) |
| --- | --- | --- |
| density | 2.72 | 2.58$^{(a)}$ – 2.62** |
| glass transition temperature | 565° C | 520° C$^{(b)}$ – 500° C** |
| softening point | 582° C | 538° C$^{(c)}$ |

$^{(a)}$C. Hirayama, J. G. Castle and M. Kuriyama, Phys. & Chem. of Glasses 9 109 (1968)
$^{(b)}$N. H. Ray Br. Polym. J. 7 307 (1975)
$^{(c)}$C. A. Elyard, P. L. Baynton and H. Rawson, Inc. Glaskong Fachvortr.) 32 36 (1959)

Additionally, polymeric glass must be annealed above its softening point to relieve internal strain whereas non-polymeric glass sags and deforms when heated above its softening point; polymeric glass does not.

The steps in the preparation of a typical glass in accordance with the invention are summarized as follows:

1. The dissolution of MCO$_3$ in the appropriate acid using an excess of the acid. At least 20% and preferably at least a 50% excess of acid is used to prevent formation of the dibasic salt, a form which is to be excluded from the finished monobasic salt used to make the glass, since the dibasic salt cannot be polymerized and hinders the polymerization processes of the monobasic salt.

2. The solution is purified so that impurities are no more than about 10 ppm. Exclusion of iron, cobalt, and nickel impurities is of particular importance, as is the exclusion of transition elements. For example, in Ca($PO_3$)$_2$ polymeric glass, the impurities become segregated into floating islands within the hot melt as the polymerization proceeds with time. When the fully polymerized melt is cast to form a polymeric glass, these segregated impurity islands become the chief point of hydrolytic attack in boiling water, thereby causing the glass structure to fail. By controlling the impurities, it has been discovered that it is possible to control the rate of hydrolytic etching of the so-produced glass, and to achieve a polymeric glass with high resistance to hydrolysis etching.

3. Evaporate the purified solution to obtain crystals. In general the residual impurities may concentrate further in the liquid as the crystals are formed. This excess liquid is discarded and the crystals are washed in a suitable organic solvent, e.g. acetone to completely remove excess acid, $H_3PO_4$, in the case of phosphate glass.

4. The pure monobasic crystals derived from solution form the basis of the glass formation. They can be melted directly to form a substantially homogeneous glass of predetermined composition containing no more than about 10 ppm of impurities. However, it is to be noted that selected impurities can be added to impart desirable properties in the finished glass. A melt hold time of sufficient duration is utilized to effect full reaction, i.e. essentially complete polymerization, to provide the desired chemical durability.

Various modifications may be employed in preparing the glasses of the inventon. The major criteria which must be observed, however, are (1) purity of the finished glass and (2) establishing polymerization in the solid state of a series of compounds, each of which reacts to form a polymer of increasing complexity, to form chains and/or cyclic polymers in the glassy state.

A particularly useful combination is borate-phosphate wherein selected borate and phosphate compounds are melted together under controlled conditions to form polymeric glasses of high stability. However these compositions are subject to phase separation.

In addition to borates, arsenates may be substituted, either partially or fully within the glassy phosphate matrix. For arsenates, $M(H_2AsO_4)_2$ compounds are prepared and mixed with corresponding phosphate compounds prior to melting as described above. Whereas $AsO_4/PO_4$ ratios can approach 1.00 if desired, $BO_4/PO_4$ ratios are preferably limited to about 0.40 or slightly larger.

The melting temperature to form the pure $[Ca(PO_3)_2]_n$ glass is about 960° C. and the softening point is about 580° C. The refractive index is 1.552 and the expansion coefficient is about $96.0 \times 10^{-7}$ in./in./degree C. The glass can be sealed to G-12 glass envelopes to form a U.V. transmitting faceplate for cathode ray tubes. In view of their relatively high chemical durability, the glasses of the present invention are superior in many respects. For example, the phosphate glasses have the following distinct advantages over quartz: (1) they can be handled at relatively low temperatures (700°-800° C.); (2) they can be sealed easily and form tighter seals than many of the other optical glasses, including quartz; (3) they are transparent in the U.V. and visible regions of the spectrum, unlike the optical glasses but similar to quartz; (4) the refractive index of the glass can be varied by addition of selected rare earths, as is known in the art, including La, Gd, and Yb, up to about 25 mol %, and up to about 1.90 refractive index; (5) they are amenable to all mechanical operations including grinding and polishing operations. In addition, it is possible to prepare an aluminum glass by the same general techniques. In this case, Al metal is dissolved in $H_3PO_4$, but the ratio must be greater than about 6.0, i.e. about 1.0 mol Al to about 6.0 mol $H_3PO_4$ in order to prevent precipitation of $AlPO_4$ which is a very insoluble salt with high melting temperature. A compound with stoichiometry of $Al(H_2PO_4)_3$ is thereby obtained, after suitable purification. It is used to form a melt to form a glass having the desired polymerized properties, imparted to the glass by the process. Such a glass is useful in nuclear waste encapsulation.

The invention will be further described by the following specific Examples. It will be understood, however, that although the examples detail certain specific compositions and operating conditions of the invention, they are provided primarily for purposes of illustration and the invention in its broader aspects is not limited thereto. Unless expressly stated otherwise, parts expressed are parts by weight.

EXAMPLES 1–8

Calcium is used as the cation precursor in each of Examples 1-8.

Example 1 — Phosphate Glass a. Prepare a solution of $H_3PO_4$ in water by adding approximately 3.00 mols $H_3PO_4$ (210 ml) to 600 ml $H_2O$ and dilute to 1000 ml total volume; 85% $H_3PO_4$ — reagent grade is used.

b. Weigh out 100.0 gm $CaCO_3$ and slowly dissolve in $H_3PO_4$ solution. Purify the solution by suitable means such as sulfide addition to precipitate insoluble transition metal sulfides. These are removed by filtration.

c. The purified solution is evaporated slowly, using a steam bath, if desired, to obtain crystals plus a liquor. The liquor is $H_3PO_4$ plus a small amount of $H_2O$. The excess is decanted and the crystals are washed in acetone, or other suitable solvent, to remove all of the excess acid. Even a very small amount of $H_3PO_4$ left in the crystals tends to produce a glass which is not stable to hydrolysis.

d. The pure crystals of the monobasic salt are placed in a clean alumina crucible of suitable size and heated to 1000° C. to cause chemical condensation and polymerization to proceed. The salt decomposes, condenses, and polymerizes to form a clear glassy melt. The melt is held in the air for at least 72 hours to complete polymerization. The clear glass melt is then cast in desired shapes and processed to relieve internal stress by annealing.

e. Alternately, the crystals are placed in an alumina crucible and, the temperature is programmed through temperature steps corresponding to chemical reactions and condensations as determined by differential thermal analysis. The reaction products are then melted by increasing the temperature to 1000° C. and processed according to step (d). The programming procedure prior to melting markedly increases the durability of the obtained glass.

f. A calcium phosphate glass is obtained having ultraviolet transparency rivaling that of optical grade quartz but with physical properties of optical glasses, i.e. improved workability and sealing characteristics. The durability of the glass, as determined by immersing a glass bar in boiling water for 96 hours, is of the order of soda-lime glass.

Example 2 — Sulfate Glass a. Prepare a sulfuric acid solution of about 6 molar by adding 336 ml concentrated $H_2SO_4$ to 600 ml $H_2O$ and dilute to 1000 ml total volume.

b. Weigh out 100.0 gm $CaCO_3$ and dissolve slowly into the $H_2SO_4$ solution which has been cooled to about 0° C. Higher temperatures can cause formation of insoluble $CaSO_4.2H_2O$. Alternately, the $CaCO_3$ may be dissolved directly in concentrated $H_2SO_4$ at 0° C. and the solution is then diluted to 1000 ml volume.

c. The acid salt is obtained by evaporating the solution at rather low temperatures, less than 70° C., or by evaporating the solution at room temperature under a vacuum of a few millimeters.

d. The monobasic salt, $Ca(HSO_4)_2 \cdot 2H_2SO_4$, is separated by filtration and dried. It is then heated to about 200° C. to cause condensation (loss of water) and polymerization. The temperature is then raised to about 400° C. where a clear melt is obtained.

e. The melt is held for a time until polymerization is complete. It is then cast and processed thermally to relieve stress induced by the casting process. Care must be exercised while the melt remains liquid to prevent the temperature from exceeding 600°-700° C. since $SO_3$ is lost from the melt through a series of decomposition reactions. The nominal glass composition is $CaS_4O_{13}$ which decomposes to form $CaS_3O_{10}$, $CaS_3O_7$ and $CaSO_4$, by successive losses of $SO_3$. The last product is crystalline and undesirable in the glassy phase.

f. Alternately a boro-sulfate glass can be made by reacting $H_3BO_3$ in $H_2SO_4$ solution. The same $H_2SO_4$ solution is prepared, as in step (a) of this example and then 61.8 gm $H_3BO_3$ is added and allowed to react. The solution may be heated to facilitate reaction. The product in solution is the $B(HSO_4)_4^-$ ion. The solution is cooled and the preceeding steps of this example are followed to prepare a boro-sulfate glass of high durability.

Example 3 — Arsenate Glass a. Weigh out 452.85 gm of $H_2AsO_4 \cdot 1/2 \, H_2O$ and dissolve in 1000 ml of water. Gentle heating to 40° C. may be required. Alternately, 344.76 gm of $As_2O_5$ may be used.

b. Weigh out 100.1 $CaCO_3$ and add slowly to acid solution. Care must be exercised not to allow the solution to heat up excessively since the insoluble form, $Ca_3(AsO_4)_2$ may precipitate out, particularly near the end of the addition of $CaCO_3$.

c. Evaporate the solution as in Example 1 to obtain crystals of $Ca(H_2AsO_4)_2 \cdot 2H_2O$. The excess acid is separated from the crystals which are then dried. The crystals may be washed in a non-aqueous solvent such as acetone or 1-butanol as an aid in removing the excess acid.

d. The crystals are melted as in Example 1 and the melt is held for a time sufficient to complete polymerization within the melt. Care should be exercised not to allow the temperature to exceed about 1000° C. since $As_2O_5$ is lost at that temperature. Preferably, the temperature is maintained between 750°-850° C. until polymerization is complete.

e. The glass melt is cast as desired and the glass casting is annealed.

f. Alternately, the crystals may be melted in a program where the temperature is held at each individual reaction temperature as determined by differential thermal analysis (DTA) and thermogravimetric analysis (TGA) with succeeding higher temperatures until a melt is obtained. The melt is then held until polymerization is complete. This results in a glass with even better hydrolysis stability than where the melt is obtained directly and then polymerization is allowed to proceed.

Example 4 — Borate Glass a. Weigh out 4 mol of $H_3BO_3$ (247.32 gm) and dissolve in 1000 ml $H_2O$. A temperature of about 85° C. is required.

b. Weigh out 100.1 gm $CaCO_3$ and dissolve in an $HNO_3$ solution sufficient in acid content to effect dissolution. Heat to 40° C.

c. Slowly add the calcium solution to the boric acid solution at 85° C. to cause precipitation of $Ca(H_2BO_3)_2 \cdot 4H_2O$. If the $H_3BO_3$ is added to the $Ca^{2+}$ solution, then a mixture of $CaHBO_3$ and $Ca(H_2BO_3)_2$ is obtained. If the ratio of $H_3BO_3$ to $Ca^{2+}$ is lowered to about 2:1, then $CaHBO_3$ is obtained. This compound is undesirable since it is high melting (around 1300° C.) and does not form a highly polymerized glass; instead it forms crystals of $Ca_2B_2O_5$ within the melt when a mixture of $Ca(H_2BO_3)_2 \cdot 4H_2O$ and $CaHBO_3$ are melted together.

d. Allow the $Ca(H_2BO_3)_2 \cdot 4H_2O$ precipitate to settle and decant liquid away. Filter and dry the crystals, taking care to wash crystals free from excess boric acid with hot water, before drying.

e. The crystals are melted as in Example 3 where the temperature is programmed according to the reactions determined by DTA and TGA up to above 1000° C. where a melt is obtained. The melt is held at 1100° C., or lower (to prevent loss of $B_2O_3$ at the more elevated temperatures) for a time sufficient to effect complete polymerization within the melt. Usually, the time required exceeds 72-96 hours.

f. The glass is then cast and annealed according to a suitable program of temperature.

Example 5 — Germanate Glasses a. There are two varieties of $GeO_2$, one insoluble and the other soluble in strong acids or strong bases. The latter must be employed. The preparation of polymerized germanate glass involves the separate preparation of the intermediate, $Ca(H_3GeO_4)_2 \cdot H_2O$ which is then condensed and polymerized to form $CaGe_2O_5$ glass. The salt intermediate may be made by either of two methods which are described below — the strong acid method or the strong base method. In either method, precautions should be observed. In the strong acid method, obtaining the monobasic salt uncontaminated by other salts is difficult while in the strong base method, there is a high probability that contamination by the basic cation, eg-$K^+$, will occur. This cation must be removed in order to obtain a stable glass.

b. Strong acid method

Weigh out 313.77 gm of $GeO_2$ and dissolve in 8 molar $HNO_3$ (about 512 ml concentrated $HNO_3$ diluted to 1000 ml). This solution is allowed to equilibrate overnight. Weigh out 100.1 gm $CaCO_3$ and dissolve in dilute $HNO_3$ solution (150) ml concentrated $HNO_3$ in 1000 ml $H_2O$). The calcium solution is added slowly to the germanate solution to obtain a clear solution. If a precipitate occurs it is removed by filtration. Alternately, the $CaCO_3$ can be added directly to the acidic germanate solution. The clear solution is then evaporated under partial vacuum until crystal formation is complete. The temperature of the solution should not exceed about 40° C. The excess liquid is decanted and the crystals are dried.

c. Strong Base Method

Weigh out 313.77 gm of $GeO_2$. Make up a strong KOH solution so that the pH exceeds 12.5. Use 168.33 gm KOH in 1000 ml $H_2O$. Cool to room temperature. Weigh out the $GeO_2$ and add slowly to the basic solution, keeping the solution cool by external cooling means if necessary. Weigh out 100.1 $CaCO_3$ and dissolve in $HNO_3$ as before. Add the $Ca^{2+}$ solution to the basic germanate solution, keeping the final solution below about 10° C. Allow the final solution to equilibrate by holding overnight. A precipitate of $Ca(OH)_2$ may first form but this will redissolve. After holding overnight, filter the solution to remove any precipitate left. Evaporate as before to obtain crystals. The crystals may be washed to remove any excess base.

d. Melt the crystals in a clean alumina crucible or other suitable container by programming the temperature according to the reactions occurring as determined by DTA and TGA. The melt is held at about 1300° C. for a time sufficiently long to complete polymerization (usually 96–108 hours).

e. The glass melt is cast and annealed according to a preselected temperature mode.

Example 6 — Tellurate or Tellurite Glasses a. Tellurate or tellurite glasses are prepared by starting with either telluric acid or tellurous acid, respectively. Weigh out 688.92 gm $H_2TeO_4 \cdot 2H_2O$ or 532.83 gm of $H_2TeO_3$. Dissolve in 1000 ml. For $H_2TeO_4$, heating may be used to effect dissolution, but for $H_2TeO_3$, the solution must be kept cold, i.e. — below 10° C. (About 50–75 ml of concentrated HCl may be added to aid dissolution of the $H_2TeO_3$). Weigh out 100.1 gm $CaCO_3$ and dissolve into the acid solution to form a clear solution.

b. Evaporate the solution under a partial vacuum until crystal formation is complete. The product is either $Ca(HTeO_4)_2 \cdot 2H_2O$ or $Ca(HTeO_3)_2 \cdot H_2O$. (These crystals melt to form polymeric glasses having stoichiometries of $CaTe_2O_7$ or $CaTe_2O_5$). The crystals are dried after excess solution has been separated from them. It is important to avoid the formation of $CaTeO_4$ which is insoluble in solution. If the solution temperature is allowed to go too high, either during dissolution or evaporation, disproportionation of $Ca(HTeO_4)_2$ or $Ca(HTeO_3)_2$ to form $CaTeO_4$ may occur. This compound does not form a polymeric glass of the desired proportions.

c. The crystals are melted under conditions similar to Example 1 where the reaction temperatures are programmed to effect condensation and polymerization to form a melt.

d. The melt is held for a time as required to complete polymerization and then the glass is cast and annealed.

e. If tellurite glass is desired, the melt is stirred by bubbling an inert gas through the melt, said gas forming a layer over the melt, excluding air and thereby preventing the oxidation of tellurous to telluric glass. Once cast, the tellurite glass remains stable.

Example 7 — Mixed Glasses a. Because of the considerable differences in solution chemistry of the various glass-forming anions such as phoshate, vanadate and the like, it is necessary to first prepare the individual compounds as given in prior Examples. The mixed glasses are then prepared by mixing the salts together in desired proportions prior to the condensation and polymerization procedure.

b. For a phosphate-borate glass, weigh out 46.76 gm of $Ca(H_2BO_3)_2 \cdot 4H_2O$ and 158.46 gm $Ca(H_2PO_4)_2 \cdot H_2O$. Mix well and place in a suitable container.

c. Heat to 1000° C. or greater to form a melt of 80% phosphate — 20% borate glass. Continue heating until polymerization is complete. Cast the glass in a suitable mold and anneal to relieve internal strain.

d. Alternately, the salts may be heated together according to a program wherein the thermal condensation and polymerization points are followed as determined by DTA and TGA, to form a melt which is further heated until polymerization is complete.

Example 8 — Non-calcium-containing glasses a. When cations other than calcium are desired, the compounds shown in Table II may be substituted for $CaCO_3$ in Examples 1 to 8:

TABLE II

| Divalent Cation | Compound | Grams |
|---|---|---|
| beryllium | $BeCO_3 \cdot Be(OH)_2$ | 56.03 |
| magnesium | $MgCO_3$ | 84.32 |
| strontium | $SrCO_3$ | 147.63 |
| barium | $BaCO_3$ | 197.35 |
| zinc | $ZnO$ | 81.37 |
| cadmium | $CdCO_3$ | 172.41 |
| lead | $PbCO_3$ | 267.20 |
| tin | $SnO$ | 134.69 |
| manganese | $MnCO_3$ | 114.95 |
| nickel | $NiCO_3$ | 118.72 |
| cobalt | $CoCO_3$ | 118.94 |
| ferrous | $FeCO_3 \cdot H_2O$ | 133.86 |

Each of the above cations is divalent, and the selected compound can be used directly as a substitute for $CaCO_3$. However, in the case of tin, manganese, iron, nickel and cobalt, precaution should be exercised to prevent oxidation of these ions to the trivalent state, e.g.: $Mn^{+2} \rightarrow Mn^{+3}$, in air at elevated temperatures. Therefore, the obtained mono-basic compounds prepared by methods given in the above examples for phosphates, borates, sulfates etc., are reacted under a blanket of neutral gas such as nitrogen, neon or argon, or alternately melted in a vacuum furnace, to prevent the oxidation from the divalent to the trivalent metal during the condensation and polymerization procedures in forming the polymerized glass melt. After polymerization is complete, those glasses subject to oxidation during glass preparation by virtue of containing either $Fe^{+2}$, $Sn^{2+}$, $Mn^{2+}$, $Ni^{2+}$ or $Co^{2+}$ have become relatively stable and the glass melts may be removed into the air while still molten and hot, and cast and thermally annealed in the normal manner.

b. Alternately, one-half of the amount given in part (a) of this Example may be combined with 50.05 gm $CaCO_3$ to produce a 50 mol% Ca-50 mol% cation glass. Obviously, other combinations may be made as well, without departing from the scope of the invention.

c. When trivalent ions are used, the amount of excess acid required to produce the desired monobasic anionic salt are changed, as shown in Table III.

TABLE III

| Anion Solution | Acid | Moles | Amount |
|---|---|---|---|
| phosphate | $H_3PO_4$ | 7.0 | 485 ml/liters of solution |
| sulfate | $H_2SO_4$ | 14.0 | 785 ml/liters of solution |
| borosulfate | $H_2SO_4$ $H_3BO_3$ | 14.0 | 785 ml $H_2SO_4$ plus 144.2 gm $H_3BO_3$/liters of solution |
| arsenate | $H_3AsO_4 \cdot \frac{1}{2} H_2O$ | 7.0 | 1056.67 gm per two liters of solution |
| borate | $H_3BO_3$ | 9.3 | 577.08 gm per 2.5 liters of solution |
| germanate | $GeO_2$ | 7.0 | 732.12 gm per liter of concentrated $HNO_3$ |
| germanate | $GeO_2$ | 7.0 | 732.12 gm in solution containing 392.77 gm KOH/liters of solution |
| tellurate | $H_2TeO_4 \cdot 2H_2O$ | 7.0 | 1607.48 gm per liter of solution |
| tellurite | $H_2TeO_3$ | 7.0 | 1243.25 gm added to liter of water containing 175 ml concentrated |

TABLE III-continued

| Anion Solution | Acid | Moles | Amount |
|---|---|---|---|
| | HCl | | |

The trivalent cations are weighed out and added to the desired anion solution as shown in Table IV.

TABLE IV

| Trivalent Cation | Compound | Grams |
|---|---|---|
| aluminum | Al(OH)$_3$ | 78.00 |
| indium | In(OH)$_3$ | 165.84 |
| gallium | Ga(OH)$_3$ | 120.74 |
| iron (ferric) | Fe$_2$O$_3$ | 159.69 |

The above cation compounds are added to the selected anion solution and the procedure is followed according to the Example given above for the selected anion glass.

Although I have described but a limited number of products and methods for preparation according to the present invention, it will be apparent to those skilled in the art that variations in both compositions and methods may be effected within the spirit of the invention. Accordingly, the invention is not to be limited except as required by the claims which follow.

I claim:

1. A method of preparing a water-insoluble chemically durable glass composition from a melt of a compound of the formula $$M(H_aX_bO_c)_d$$

wherein M is a metal of the group consisting of aluminum, zinc, cadmium, iron, tin, manganese, lead, nickel, cobalt, gallium and indium and the alkaline earth metals beryllium, magnesium, calcium, strontium and barium; X is an anionic species selected from the group consisting of phosphorus, boron, arsenic, sulfur, germanium and tellurium; $a$ has a value of 1 to 3; $b$ has a value of 1 to 4; $c$ has a value of 1 to 10, $d$ is 2 or 3 depending upon the valence of M, and said values of $a$, $b$, $c$ and $d$ are determined by the chemistry of the compound being prepared, which comprises preparing a purified solid stoichiometric compound of said formula by forming an aqueous solution from an acid of said anionic species with said metal, wherein said acid is in amounts of at least 40% excess, purifying said solution containing metal and anionic species, by isolating said solid compound from said aqueous acid solution of said metal and said anionic species, removing substantially all excess of remaining acid, heating said purified stoichiometric compounds at elevated temperature in a controlled heating cycle in a sequence of increased temperatures to effect a chemical intrareaction and form a substantially homogeneous melt, and retaining said melt until polymerization of said compound is essentially complete.

2. The method of claim 1 wherein X is phosphorus.
3. The method of claim 1 wherein X is boron.
4. The method of claim 1 wherein X is sulfur.
5. The method of claim 1 wherein X is tellurium.
6. The method of claim 1 wherein M is magnesium.
7. The method of claim 1 wherein M is beryllium.
8. The method of claim 1 wherein M is aluminum.
9. The method of claim 1 wherein M is iron.
10. The method of claim 1 wherein M is calcium.
11. The method of claim 1 wherein M is strontium.
12. The method of claim 1 wherein M is barium.
13. The method of claim 1 wherein M is zinc.
14. The method of claim 1 wherein M is cadmium.
15. The method of claim 2 wherein M is magnesium.
16. The method of claim 2 wherein M is beryllium.
17. The method of claim 2 wherein M is aluminum.
18. The method of claim 2 wherein M is iron.
19. The method of claim 2 wherein M is calcium.
20. The method of claim 2 wherein M is strontium.
21. The method of claim 2 wherein M is barium.
22. The method of claim 2 wherein M is zinc.
23. The method of claim 2 wherein M is cadmium.
24. The method of claim 3 wherein M is magnesium.
25. The method of claim 3 wherein M is beryllium.
26. The method of claim 3 wherein M is aluminum.
27. The method of claim 3 wherein M is iron.
28. The method of claim 3 wherein M is calcium.
29. The method of claim 3 wherein M is strontium.
30. The method of claim 3 wherein M is barium.
31. The method of claim 3 wherein M is zinc.
32. The method of claim 3 wherein M is cadmium.
33. A method of preparing a water-insoluble chemically durable phosphate glass composition from a melt of a Ca(H$_2$PO$_4$)$_2$.H$_2$O compound which comprises preparing a purified solid stoichiometric compound of the calcium phosphate of said formula by isolating the purified compound from an aqueous acid solution of calcium and of an acid of phosphorus in substantial excess, removing said excess acid from the resulting purified solid stoichiometric compound, heating and condensing said purified stoichiometric compound, melting said purified stoichiometric compound at elevated temperature to effect a chemical intrareaction and form a substantially homogeneous melt and polymerizing and retaining said melt until polymerization of said calcium phosphate is essentially complete.

34. A method of preparing a water-insoluble chemically durable glass composition from a melt of Mg(H$_2$PO$_4$)$_2$.3H$_2$O which comprises preparing a purified solid stoichiometric compound of the magnesium phosphate of said formula by isolating the purified compound from an aqueous acid solution of said magnesium and of said phosphate as the acid, in substantial excess, removing the excess acid from the resulting purified solid stoichiometric compound, heating and condensing said purified stoichiometric compound to cause chemical intrareaction, melting said purified stoichiometric compounds at elevated temperature to form a substantially homogeneous melt, and polymerizing and retaining said melt until polymerization of said magnesium phosphate compound is essentially complete.

35. A chemically durable glass prepared from a melt at elevated temperatures from a compound having stoichiometric proportions and of the formula M(H$_a$X$_b$O$_c$)$_d$, where M is a metal of the group consisting of aluminum, zinc, cadmium, iron, tin, manganese, lead, nickel, cobalt, gallium, and indium and the alkaline earth metals beryllium, magnesium, calcium, strontium and barium; X is an anionic species selected from the group consisting of phosphorus, boron, sulfur, arsenic, germanium and tellurium, $a$ has a value of 1 to 3; $b$ has a value of 1 to 4; $c$ has a value of 1 to 10, $d$ is 2 or 3 depending upon the valence of M, said glass characterized by substantial insolubility when boiled in water for at least 50 hours at atmospheric pressures.

36. The glass of claim 35 wherein M is a metal from the group consisting of calcium and magnesium and X is an anionic species selected from the group consisting of phosphorus, boron and sulfur.

37. A chemically durable calcium phosphate glass prepared from a melt at elevated temperatures of Ca(H$_2$PO$_4$) having stoichiometric proportions, said glass characterized by substantial insolubility when boiled in water for at least 50 hours at atmospheric pressures.

38. A chemically durable glass prepared from a melt at elevated temperatures of Mg(H$_2$PO$_4$)$_2$ having stoichiometric proportions, said glass characterized by substantial insolubility when boiled in water for at least 50 hours at atmospheric pressures.

* * * * *

UNITED STATES PATENT AND TRADEMARK OFFICE
CERTIFICATE OF CORRECTION

PATENT NO. : 4,087,511
DATED : May 2, 1978
INVENTOR(S) : Richard C. Ropp

It is certified that error appears in the above-identified patent and that said Letters Patent are hereby corrected as shown below:

Column 13, Claim 37, lines 2 and 3 "$Ca(H_2PO_4)$"

should be -- $Ca(H_2PO_4)_2$ --.

Signed and Sealed this

Tenth Day of October 1978

[SEAL]

Attest:

RUTH C. MASON
*Attesting Officer*

DONALD W. BANNER
*Commissioner of Patents and Trademarks*